US011477299B2

(12) United States Patent
Gloanec et al.

(10) Patent No.: US 11,477,299 B2
(45) Date of Patent: Oct. 18, 2022

(54) CONDITIONAL IMPLEMENTATION OF A SERVICE

(71) Applicant: Orange, Issy-les-Moulineaux (FR)

(72) Inventors: Simon Gloanec, Chatillon (FR); Herve Marchand, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 409 days.

(21) Appl. No.: 15/845,346

(22) Filed: Dec. 18, 2017

(65) Prior Publication Data

US 2018/0176309 A1 Jun. 21, 2018

(30) Foreign Application Priority Data

Dec. 16, 2016 (FR) ...................................... 1662600

(51) Int. Cl.
*H04L 67/51* (2022.01)
*H04L 12/28* (2006.01)
*H04W 4/021* (2018.01)
*H04W 4/70* (2018.01)
*H04W 48/04* (2009.01)
*H04L 67/125* (2022.01)
*H04M 1/72415* (2021.01)
(Continued)

(52) U.S. Cl.
CPC ............ *H04L 67/51* (2022.05); *H04L 12/282* (2013.01); *H04L 12/2816* (2013.01); *H04L 12/2821* (2013.01); *H04L 67/125* (2013.01); *H04L 67/52* (2022.05); *H04M 1/72415* (2021.01); *H04M 1/72463* (2021.01); *H04W 4/021* (2013.01); *H04W 4/70* (2018.02); *H04W 48/04* (2013.01); *H04W 4/023* (2013.01)

(58) Field of Classification Search
CPC .... H04W 4/70; H04L 12/2816; H04L 12/282; H04L 67/18; H04M 1/72533
See application file for complete search history.

(56) References Cited

U.S. PATENT DOCUMENTS 6,563,430 B1 5/2003 Kemink et al.
2004/0203919 A1* 10/2004 Ross ........................ H04L 67/52
455/466
(Continued)

OTHER PUBLICATIONS

French Search Report dated Aug. 10, 2017 for corresponding French Application No. 1662600, filed Dec. 16, 2016.
(Continued)

*Primary Examiner* — Dhairya A Patel
*Assistant Examiner* — Sujana Khakural
(74) *Attorney, Agent, or Firm* — David D. Brush; Westman, Champlin & Koehler, P.A.

(57) ABSTRACT

A method is provided for conditional implementation of a service on an object connected to a local area network. The implementation of the service is associated on the object with at least one location datum. The method includes the following acts performed on the object: receiving a request to implement the service from a first terminal, the request including at least the identifier of the service and the identifier of the terminal; receiving a message including at least one location datum of the first terminal; comparing the location datum of the first terminal with the location datum associated with the implementation of the service; and, as a function of the results of the comparison, implementing the service on the object.

11 Claims, 2 Drawing Sheets

(51) Int. Cl.
*H04M 1/72463* (2021.01)
*H04L 67/52* (2022.01)
*H04W 4/02* (2018.01)

(56) References Cited

U.S. PATENT DOCUMENTS

| | | | | |
|---|---|---|---|---|
| 2007/0177161 A1* | 8/2007 | Ishii | ............... | H05B 47/155 |
| | | | | 356/614 |
| 2010/0279673 A1* | 11/2010 | Sharp | ............... | H04L 67/125 |
| | | | | 455/419 |
| 2012/0319825 A1* | 12/2012 | Shimy | ............... | H04L 12/2821 |
| | | | | 340/12.5 |
| 2014/0167929 A1* | 6/2014 | Shim | ............... | G08C 17/02 |
| | | | | 340/12.5 |
| 2015/0229626 A1* | 8/2015 | Hauhn | ............... | H04L 12/282 |
| | | | | 726/4 |
| 2015/0294367 A1* | 10/2015 | Oberbrunner | ...... | G06Q 30/0252 |
| | | | | 705/14.66 |
| 2016/0014108 A1* | 1/2016 | Chen | ............... | H04L 67/10 |
| | | | | 726/4 |
| 2016/0044719 A1* | 2/2016 | Sidhu | ............... | H04W 68/00 |
| | | | | 370/329 |

OTHER PUBLICATIONS

English translation of the Written Opinion dated Aug. 10, 2017 for corresponding French Application No. 1662600, filed Dec. 16, 2016.

* cited by examiner

CONDITIONAL IMPLEMENTATION OF A SERVICE

TECHNICAL FIELD

The invention relates to the field of telecommunications and, more particularly, to the implementation of a service in a local area communication network.

Generally, the invention applies to the terminals of such a network.

BACKGROUND

A domestic network is a computer network which links together, by wire or wirelessly, the terminals (computers, printing and storage peripherals, home automation peripherals, etc.) of a home capable of communicating with one another. A domestic network generally comprises a router device, also commonly called gateway, an intermediate element ensuring the redirection or routing, of the data packets between the different terminals and networks which are connected to it.

In the context of a domestic network, and more particularly a home automation network, a user has the possibility of executing a given service on a given terminal having specific features (for example, controlling a camera, opening a door, etc.). Such a terminal is hereinafter called a connected object (IoT, for Internet of Things). Such a service can be seen as a set of software components, or programs, associated with a set of hardware components. The service can be seen as a set of actions that are strung together on the connected object. The services provided by a connected object can be driven by the users from a terminal, typically a smartphone. These smartphones can be connected to a wide area network, for example a mobile network, or to a local area network, for example by Wi-Fi.

The control of certain services can be authorized remotely. However, in some cases (for security or usage reasons for example), it is desirable to limit the access to certain applications only when the user is within the perimeter of the domestic network. For example, a user can remotely control the state of a garage door ("is the door open or closed?") but it is preferable to activate the door only when he or she is local (action of opening or closing the door).

These days there are solutions for limiting the implementation of such services to a user of the local area network. However, defining whether a user is local or remote generally relies on the type of access network used: if the user is connected to a mobile network, he or she is considered to be distant, but if, on the other hand, he or she is connected (for example by Wi-Fi) to the gateway of the local area network, he or she is considered to be local. This kind of solution therefore involves a deliberate action by the user who has to be connected by Wi-Fi when he or she wants to access authorized services for local access. However, a user may prefer to remain connected only to a mobile network while being in his or her home: the user does not necessarily want to switch to Wi-Fi, or does not have the rights of access to the Wi-Fi network, or prefers to remain connected to the mobile network because the bit rate is higher, etc.

An exemplary embodiment of the invention offers a solution that does not present the drawbacks of the prior art.

SUMMARY

To this end, according to a functional aspect, the subject of an exemplary embodiment of the invention is a method for conditional implementation of a service on an object connected to a local area network, the implementation of said service being associated on said object with at least one location datum, the method comprising the following steps on the object:

A. reception of a request to implement the service from a first terminal, said request comprising at least the identifier of the service and the identifier of said terminal;

B. reception of a message comprising at least one location datum of the first terminal;

C. comparison of the location datum of the first terminal with the location datum associated with the implementation of the service;

D. as a function of the results of the comparison, implementation of the service on the object.

"Service" should be understood here to mean a set of actions to be performed on at least one connected object of the network.

Advantageously according to the method, the service offered by the connected object is implemented, conditionally, only if the location datum associated with the service corresponds to the actual location of the terminal. If no constraint is associated with the service, that is to say if it can be accessible by a terminal regardless of its position, it can be implemented unconditionally. If, on the other hand, a location constraint is imposed to be able to benefit from the service, for example if the terminal has to be situated within a certain distance from the local area network (and therefor from the home of the user), a check is carried out according to the method to ensure that the terminal requesting the service respects this constraint. If it does, the service can be implemented by the connected object. If not, it is not implemented. The location datum generally indicates a location of the terminal, in geographic terms (the terminal is in Japan, in the United States, in Brittany, Rennes, at the GPS coordinates X: 48.083328 Y: −1.68333, etc.) or distance terms (the terminal is 100 km from the house, 30 km from the object, 100 m from the gateway of the local area network, etc.). This conditional implementation improves the securing of the access to the connected object, some objects having to preferably be manipulated by a user who is not too far away from them, and, in addition, improves the security of the communication between the terminal and the object because a local communication is more difficult to intercept than a long distance communication.

It will be noted that the method applies to any existing connected object, without modification of the existing hardware, by simply adding to it a software program capable of executing the steps of the method.

It will also be noted that the connected object can receive the service request from the local area network or not. In particular, the mobile network may advantageously be exploited to transmit the request from the terminal to the object, if the user has not wanted to connect (by Wi-Fi) to the local area network.

According to a particular implementation of the invention, a method as described above is characterized in that it further comprises, prior to the reception of a message comprising at least one location datum of the first terminal, the steps of:

evaluation of the location datum associated with the implementation of the service, and according to the results of the evaluation:

transmission, over the local area network, of a request for location of the first terminal, comprising at least said identifier of said first terminal.

Advantageously according to this mode, the connected object takes the initiative to send a request to the gateway to receive, in exchange, a location datum of the terminal which has sent the request to implement the service. This avoids the need for the gateway to regularly send this message, and moreover allows the object to send the request only in the cases deemed relevant, that is to say when the implementation is actually conditional. It is in fact useful to send such a request (and to receive a response) if the implementation of the service is systematic, independently of the location of the terminal.

According to a particular implementation of the invention, which will be able to be implemented alternatively or in addition to the preceding one, a method as described above is characterized in that it further comprises the following steps:
  acquisition of the location datum to be associated with the implementation of the service;
  storage of the location datum associated with the implementation of the service.

This implementation of the invention makes it possible to dynamically store, on the object, the location datum associated with a service provided by the object. For example, if this object is a door, it can be closed by a terminal which is located anywhere but opened only by a terminal which is located in Rennes. This configuration can advantageously be changed over time, by the repetition of the steps of acquisition and of storage of the location datum associated with the service.

According to another particular implementation of the invention, which will be able to be implemented alternatively or in addition to the preceding ones, a method as described above is in addition characterized in that:
  the location datum of the first terminal received indicates a distance from the first terminal to a second terminal of the local area network;
  the location datum associated with the implementation of the service indicates a maximum distance from the first terminal to said second terminal of the local area network.

Advantageously according to this implementation, the location datum indicates a distance from the terminal to the domestic gateway, or to any terminal of the network, even to the connected object itself. Directly or indirectly, the location datum therefore indicates the distance between the terminal which requires the service and the object which provides the service. The location datum associated with the service indicates a maximum authorized distance. If the distance between the terminal and for example the gateway is greater than the maximum distance authorized for the service, the latter is not implemented. This embodiment therefore makes it possible to authorize or prohibit certain operations on the connected object depending on whether the object is located within or beyond a certain distance (for example, 1 km, 100 m, 20 m, etc.).

According to another particular implementation of the invention, which will be able to be implemented alternatively or in addition to the preceding ones, a method as described above is in addition characterized in that:
  the location datum of the first terminal received indicates the presence of the first terminal within the range of the local area network;
  the service is implemented on the object only if the first terminal is within the range of the local area network.

This implementation of the invention makes it possible to implement a service on a connected object if the terminal which requires the service is located within the range of the local area network. "Range of the local area network" should be understood to mean the area of coverage of the local area network, in other words the area within which the terminal can dialogue with the service gateway. If the terminal is not within the range of the network, the service will not be implemented. Naturally, the determination that the terminal is within the range of the local area network does not mean that the terminal is necessarily connected by Wi-Fi to the service gateway.

According to another functional aspect, an embodiment of the invention also relates to a method for storing the location of a first terminal of a local area network, the method comprising the following steps on a third terminal of the local area network:
  obtaining a location datum of said first terminal;
  storing the location datum of said first terminal in association with its identifier;
  receiving a request for location of said first terminal, said request comprising an identifier of the terminal;
  sending a response comprising the location datum of said first terminal.

The storage method has the same advantages as those described in relation to the conditional implementation method. An object which has received a service request from a (first) mobile terminal (not necessarily connected to the local area network) can interrogate another terminal of the network, typically the gateway, to obtain the location information, or datum, of the (first) terminal, in order to decide whether it can or cannot implement the service. It will be noted that this information is not necessarily located on the gateway itself, provided that it is accessible to it (for example in the cloud or on a terminal of the network of PC, hard disk, and other such type).

According to a particular implementation of the invention, a method for storing the location as described above is further characterized in that the step of obtaining a location datum of the first terminal comprises a substep of reception of a message from said terminal.

Advantageously according to this embodiment, the reception of a message from the terminal allows the third terminal (typically the gateway) to compute the location of the (first) terminal. The message can bear the information explicitly (by indicating, for example, as a parameter, the geographic location of the terminal) or implicitly (by simple detection of the message, which indicates that the terminal is indeed within the range of the gateway, or by measuring, for example, the power of the signal received in order to deduce therefrom a distance indication).

According to a variant of this particular implementation of the invention, a method for storing the location as described above is further characterized in that said message is broadcast over a channel distinct from the local area network.

Advantageously according to this embodiment, the terminal presence message (M1) is broadcast over a channel distinct from the network of the local area network (Wi-Fi or ADSL), for example over a Bluetooth channel (BLE, Zigbee, etc.). This avoids the bearer of the terminal having to switch on the Wi-Fi module to connect to the local area network, for reasons of security, of simplicity or of energy saving. This is true in particular if he or she communicates with the connected object via the mobile network. If the Bluetooth message is received by the gateway, it means that the terminal is indeed within the range of the local area network, since the Bluetooth range, in particular BLE, is less than that of the local area network.

According to another particular implementation of the storage method of the invention, which will be able to be implemented alternatively or in addition to the preceding one, a method for storing the location as described above is further characterized in that the location datum of the first terminal indicates a distance between the first terminal and the third terminal.

This storage method has the same advantages as those described in relation to the conditional implementation method. The measurement of the distance can be performed by any means available to the person skilled in the art.

According to another particular implementation of the storage method of the invention, which will be able to be implemented alternatively or in addition to the preceding ones, a method for storing the location as described above is further characterized in that the location datum of the terminal indicates whether the first terminal is within the range of the local area network.

This storage method has the same advantages as those described in relation to the conditional implementation method. It is particularly simple to implement since the domestic gateway generally knows the devices which are connected to it (which are therefore located within the range of the local area network).

According to a hardware aspect, an embodiment of the invention also relates to a connected object of a local area network, capable of conditionally implementing a service, the implementation of said service being associated on said object with at least one location datum, said object comprising the following modules:
  a module for receiving a request to implement the service from a first terminal, said request comprising at least the identifier of the service and the identifier of said first terminal;
  a module for receiving a message comprising at least one location datum of said first terminal;
  a module for comparing the location datum of said first terminal with the location datum associated with the service;
  a module for implementing the service on the object.

The term module can correspond equally to a software component and to a hardware component or a set of hardware and software components, a software component itself corresponding to one or more computer programs or subprograms or, more generally, to any element of a program capable of implementing a function or a set of functions as described for the modules concerned. Likewise, a hardware component corresponds to any element of a hardware assembly capable of implementing a function or a set of functions for the module concerned (integrated circuit board, chip card, memory card, etc.).

According to another hardware aspect, an embodiment of the invention also relates to a device for storing the location of a terminal in a local area network, comprising:
  a module for obtaining a location datum of a first terminal in association with its identifier;
  a module for sending a message comprising the location datum of the first terminal.

According to another hardware aspect, an embodiment of the invention also relates to a service gateway comprising a device for storing the location of a terminal as described previously.

According to another hardware aspect, an embodiment of the invention also relates to a system comprising a service gateway as described previously, at least one connected object and a terminal capable of requesting a service of the connected object, as described previously.

According to another hardware aspect, an embodiment of the invention also relates to a computer program capable of being implemented on the equipment as defined above, the program comprising code instructions which, when the program is executed by a processor, perform the steps of the method for conditional implementation of a service as defined above.

According to yet another hardware aspect, an embodiment of the invention relates to a storage medium that can be read by a data processor on which is stored a program comprising program code instructions for executing the steps of the method for storing the location defined above.

One or more embodiments of the invention will be better understood on reading the following description, given by way of example and with reference to the attached drawings.

DETAILED DESCRIPTION OF AN EXEMPLARY EMBODIMENT ILLUSTRATING THE INVENTION

Figure 1:
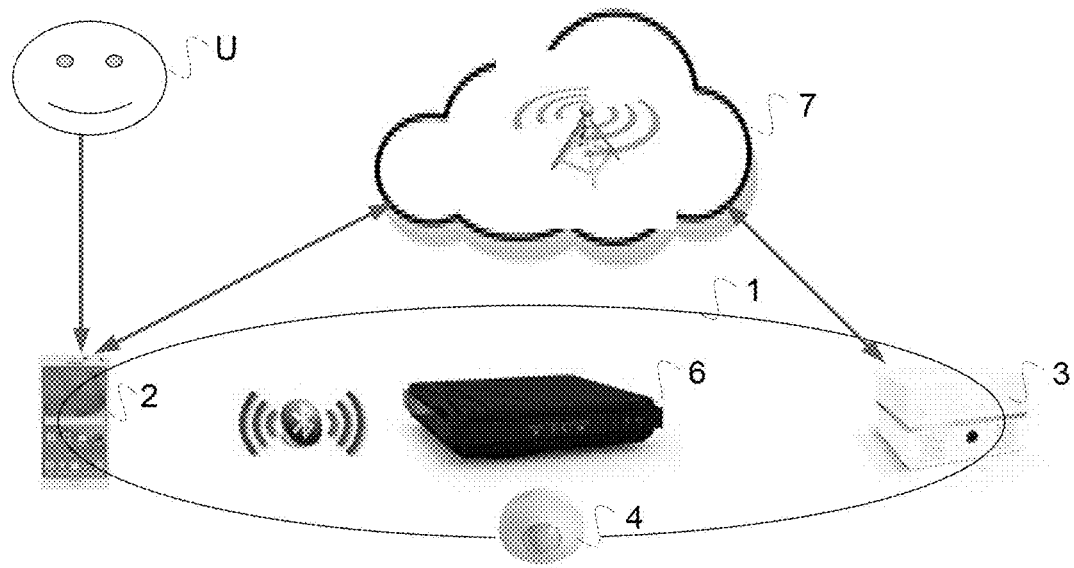
FIG. 1 illustrates the general context of an embodiment of the invention.

FIG. 1 illustrates the general context of an embodiment of the invention.

The local area network (1) is for example an IP (Internet Protocol) local area network. The network (1) in this example comprises a network management element (6) hereinafter called "service gateway" or more simply "gateway", and terminal equipment items (3, 4) connected to this local area network, capable of establishing communications between them and the gateway. The gateway can also be considered in the broader sense as a terminal of the local area network. It is for example a domestic gateway known by the marketing name "Livebox". It comprises a Wi-Fi communication function, or access point, allowing it to communicate with the terminals of the wireless network. Alternatively, the router equipment item could be a smart router, a hub, etc. According to this exemplary embodiment, the gateway further comprises a second communication module making it possible to receive messages broadcast over a short-range radio channel, such as, for example, Bluetooth, Zigbee, etc. It will be recalled that Bluetooth is a short-range network technology making it possible to link devices together wirelessly. Bluetooth makes it possible to transmit data or voice between equipment items equipped with radio modules, over a radius, or range, of the order of from ten or so meters to a little less than a hundred or so meters and with low electrical consumption. The Bluetooth used in this exemplary embodiment is preferably of Bluetooth Low Energy, or BLE, type, characterized by a very low consumption and range of the order of a meter (3 or 4 at most), which is sufficient for the type of transactions targeted. The term Wi-Fi, meanwhile, covers a set of standards of the IEEE 802.11 specification for wireless communications that can range up to a few hundreds of meters. The term Zigbee designates a set of high-level communication protocols using low consumption radio transmissions, based on the IEEE 802.15.4 standard.

The terminal 3 is any terminal of the local area network, connected to the service gateway: a light sensor, a motion sensor, a lamp, a digital tablet, a connected electric heater, an iron, a blind, a refrigerator, a garage door, etc. Such terminals are also called connected objects, or IOT, in other words an internet of things. These terminals are of heterogeneous nature. They can, for example, differ by their operating system (Windows, Linux, Android, etc.), their type of connection to the local area network (Ethernet, Wi-Fi, Bluetooth, etc.), the actions that they are capable of (measuring brightness, detection a movement, switching on the lamp, opening the door, triggering the recording of a film, switching on the heating, etc.).

According to this example, the terminal 4 is a connected camera.

The terminal 2 is, according to this example, a smartphone of the user U. Depending on the choice of the user, the smartphone is connected to a mobile network (7), for example UMTS, 4G, 5G, etc., and/or to the local area network, for example by Wi-Fi, when the smartphone is within the range of the local area network. The range of the network naturally depends on the type of network and on the radio communication channel used. A specific application (Android, IOS, etc.) can be installed on the smartphone to request a service of one or more connected objects (3, 4): increase the brightness, switch on the heating, open the door, etc.

It is desirable for some of these actions to be performed only when the user is within the range of the local area network: it is unusual to want to open the door of the garage when away from home; it is dangerous to switch on the iron if not at home, etc.

According to the known prior art, some applications are in fact executed only when the smartphone is connected locally, particularly in the case of an application dedicated to a Wi-Fi, Bluetooth, Zigbee, etc. communication. There is thus an indirect assurance that it is indeed one of the users of the local area network (and therefore of the home) who is controlling the object, and not an intruder; there is also an assurance that the user, even if legitimate, does not erroneously trigger an undesirable action on one of the objects.

However, in such a case the user is forced to connect locally to be able to execute his or her application and thereby launch the service. Now, the user may not want to connect locally, for reasons of security, of energy saving, of access problems or of bandwidth (the bandwidth of a 4G network often being higher than that of a Wi-Fi network, the user may be reluctant to connect by Wi-Fi to the local area network on returning home).

An embodiment of the invention therefore proposes associating, with the services offered by the connected objects, a notion of location involving a notion of proximity. It is understood here that the user is in proximity when he or she is within the range of the local area network. It can also be said that he or she is "local". In the context of this embodiment of the invention, he or she can control the "door" object for an opening or a closure when he or she is local, but only for the closure when he or she is distant.

The solution proposed consists in relying on a local broadcast protocol (like Bluetooth) to alert the gateway to the local presence of the user. The user can therefore continue to communicate only through the mobile network, without needing to connect to the local area network.

Figure 2:
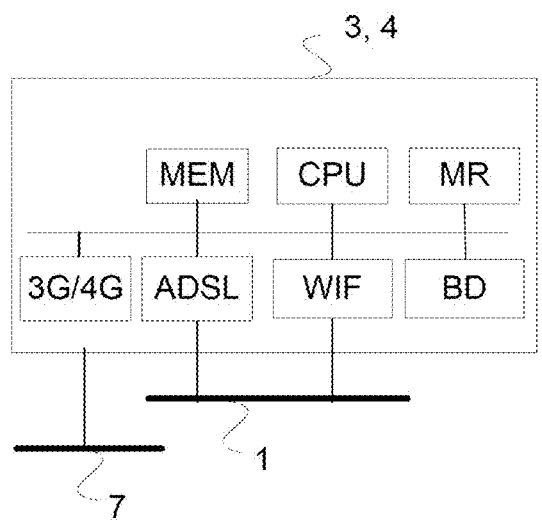
FIG. 2 represents a block diagram of a connected object according to an embodiment of the invention.

FIG. 2 schematically represents an architecture of a connected object, or IoT (3, 4), implementing an embodiment of the implementation of a service according to the invention.

The object comprises, conventionally, memories (MEM) associated with a processor (CPU). The memories can be of ROM (Read Only Memory) or RAM (Random Access Memory) or even Flash type. It communicates with the local area network via the Ethernet (ADSL) module and/or the Wi-Fi module for a wired or wireless communication. It communicates with a terminal which takes control of it to request a service of it through a Wi-Fi or mobile (3G/4G) network. The terminal further comprises, according to an embodiment of the invention, several hardware and/or software modules, allowing it to store the lists of services (actions) which are applicable to it, in association with a location indicator, to evaluate the commands received and to implement them. For example in FIG. 2, this function is provided by the following modules:

- a database module BD, which is used in particular to store a table of services (actions) that can be performed on the object, to be associated with a notion of "location" of the user (local or distant). It will be noted that this database can form part of the memory MEM, or, alternatively, be attached to a local disk or any other data medium, internal or external.
- a software module MR capable of evaluating a command received from the network (for example from the smartphone) and undertaking a certain number of actions accordingly, to provide or not provide a requested service.

Figure 3:
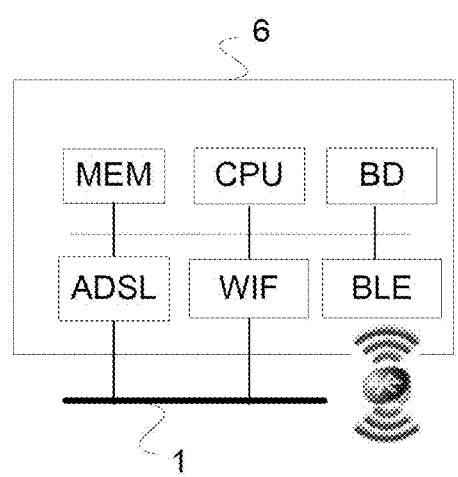
FIG. 3 represents a block diagram of a domestic gateway according to an embodiment of the invention.

FIG. 3 schematically represents an architecture of a service gateway (6) implementing an embodiment of the storage of the location of a terminal according to the invention.

The gateway (6) comprises, conventionally, memories (MEM) associated with a processor (CPU). The memories can be of ROM (Read Only Memory) or RAM (Random Access Memory) or even Flash type. It communicates with the local area network via the Ethernet (ETH) module on the one hand and possibly a Wi-Fi module for a wireless communication. It is also equipped, according to this embodiment, with a Bluetooth Low Energy (BLE) module which allows it to receive messages from a terminal (2).

A part of the memory MEM is linked to access point WIF and stores, among other things, conventionally, the parameters of identification and of association of the domestic terminals with the access point WIF (table of identifiers comprising the unique identifiers of the domestic terminals which have already been authorized to access the domestic network via the access point, routing elements, etc.) and, according to an embodiment of the invention, a table of identifiers comprising the identifiers of the terminals present within the range of the local area network, plus, possibly, a more precise indication of location of the terminal.

Figure 4:
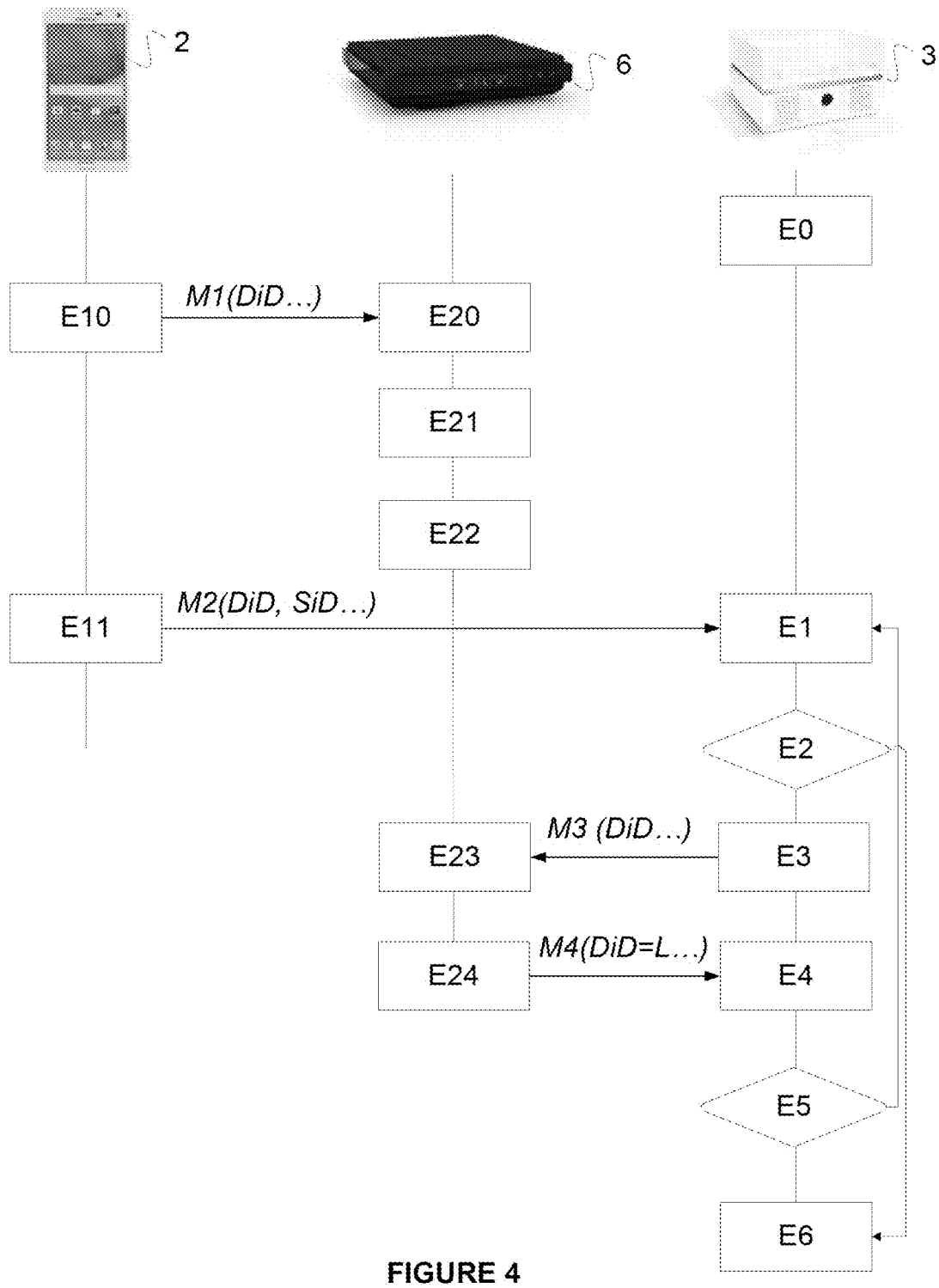
FIG. 4 represents the exchanges between a domestic gateway, a smartphone and a connected object of the local area network according to an embodiment of the invention.

FIG. 4 represents, in flow diagram form, the implementation of a service on a connected object, according to an embodiment of the invention.

The service described with the support of FIG. 1 is returned to here, namely: the user U wants to open the door of his or her garage to leave the house, by controlling the "door" object (3) via his or her smartphone (2) (moreover, it is essential for him or her not to be able to erroneously open the door (3) when distant from his or her home). He or she may or may not be connected to the Wi-Fi network.

Preferably, he or she is not connected to the Wi-Fi network and communicates with the gateway via his or her Bluetooth module (BLE).

The implementation of this embodiment of the invention comprises the following steps.

In an initial step E0, the user defines, for the connected object, the services that are accessible locally or remotely. A table is constructed in the memory of the terminal. It can for example take the form schematically represented below:

TABLE 1

Example of look-up table (T) in memory for the connected object

| Service | Action | Local(L)/Distant(D) | Resulting Action |
|---------|--------|---------------------|------------------|
| A | Door test | D | Message indicating whether the door is open/closed |
| B | Opening door | L | Opening of the door |
| C | Closing door | D | Closure of the door |

In a step E10, the smartphone broadcasts, permanently and with a certain period (for example every 60 seconds), a message M1 (or first message) comprising a unique identifier of the terminal (DiD). This broadcast can be permanent (as soon as the Bluetooth module is activated on the smartphone, for example) or triggered by an event (recognition of the domestic gateway by the smartphone, manual or automatic activation of the method when the smartphone "returns home", etc.).

In a step E20, if the terminal is within its range (according to this example, within the range of the Bluetooth link), the gateway receives the identifier DiD of the terminal. It obtains or computes a location datum of the terminal in step E21. This step can be performed by using any known method available to the person skilled in the art, for example:
- geographic location of the terminal (based on obtaining GPS coordinates, etc.);
- detection of the presence within the range of the local area network:
  - for example if the gateway receives a Wi-Fi message, it means that the terminal is within the range of the Wi-Fi network;
  - alternatively, the gateway may simply consult, in memory, the table of the devices which are connected to it (it is well known that a domestic gateway permanently retains a table of the terminals which are connected to it);
- detection of departure from the local area network: if the gateway no longer receives any message from the terminal for a defined time (for example 120 seconds), it considers that the terminal is no longer present in the network, in other words it is at a distance greater than the range of the Wi-Fi/Bluetooth network;
- reception of a message explicitly bearing the datum (for example, parameter of the message M1 indicating that the terminal is "local");
- reception of a message implicitly bearing the datum: for example, if the message is received by Wi-Fi, it means that the distance between the terminal and the gateway is less than the range of the Wi-FI network (a few tens of meters); if the message is received by Bluetooth (BLE), it means that the distance between the terminal and the gateway is less than the range of the Bluetooth link (a few meters); if the message is received by NFC, that means that the distance between the terminal and the gateway is less than the range of the near field (a few centimeters); etc. Moreover, if the message is received, the associated power of the signal can be an indicator of the distance at which the terminal is located;
- sending of periodic messages to the terminal (ping, BLE message, etc.) and waiting for a response;
- etc.

Then, during a step E22, the gateway updates its presence table in memory, that is to say that it memorizes the location information, or datum, of the terminal in association with an identifier of said terminal;

TABLE 2

Example of presence table in gateway memory

| Terminal | Locally present | Distance |
|----------|-----------------|----------|
| 3 | Yes | 3 m |
| 5 | No | in Japan |
| 4 | Yes | 10 m |

In a step E11, the smartphone sends, through the mobile network (or the Wi-Fi if it is connected to the gateway by Wi-Fi), a request (or message M2) to the connected object for a service SiD by specifying its identifier (DiD) in the request.

The connected object receives the request in a step E1, recovers the identifiers of the requested service (SiD) and of the sending terminal (DiD), and accesses its table of services.

Then, in step E2, the connected object performs a test to ascertain the conditions of access to the service. If the service is accessible only locally, the connected object interrogates the gateway during a step E3 to ascertain whether the terminal is present locally, by sending a message M3 over the local area network, to the gateway, by specifying the identifier (DiD) of the terminal which sent the service request. If such is not the case, that is to say if the service can be provided unconditionally, it is not necessary to interrogate the gateway since the service can be provided regardless of the location (distant or local) of the smartphone. In this case, the method can be followed directly by step E6 of implementation of the service.

Alternatively to step E2, it is possible to imagine the object systematically interrogating the gateway (whether the service is associated with a local identifier or not). In this case, it will have to then check compatibility between the location of the terminal and the service location attribute, or datum.

The gateway receives the message M3 in a step E23, interrogates its table of services in memory and responds in a step E24 to the connected object. The gateway responds through a predefined protocol, based for example on the UPnP standard. It will be recalled that the aim of the UPnP standard is to allow terminals to connect easily and communicate simply within a local area network. It constitutes a set of communication protocols based on the IP protocol and promulgated by the UPnP standardization forum ("UPnP forum"). This message can take any form, provided that it comprises the identifier of the terminal and its location datum; it is denoted: M4 (DID=L) in the figure, to signify that the terminal whose identifier is DiD is present locally.

This message is received by the object in a step E4, then analyzed in a step E5 by the connected object: if the location datum associated with the service requires a local terminal, and if the terminal requesting the service is effectively local, the request is accepted and the service implemented during step E6 (door opening, closure, test, etc.); otherwise, it is denied and the method on the object can revert for example to the step E1 awaiting a new request.

It goes without saying that the embodiments described above have been given in a purely indicative and non-limiting manner, and that many modifications can easily be made by the person skilled in the art without in any way departing from the scope of the invention. Many other examples of service can in particular be proposed.

The invention claimed is:

1. A method for conditional implementation of a service on an object connected to a local area network through a gateway including a location management device, the method comprising the following acts performed by the object:
storing look-up data in a memory of the object, said look-up data indicating, for at least one service, whether the service is conditioned on said object with at least one location datum or not;
receiving from a first terminal a request to implement a service of the at least one service for which look-up data is stored in the memory, said request comprising at least an identifier of the service and an identifier of said first terminal, wherein the service corresponds to at least one action to be performed by the object in the local area network;
using the look-up data in the memory to determine whether the requested service is conditioned on said object with at least one location datum or not;
if the requested service is conditioned on said object with at least one location datum, controlling operation of the object by:
transmitting to the management device of the gateway a request for determining location of said first terminal, said request comprising said identifier of the first terminal;
receiving a response message from the management device comprising at least one location datum of the first terminal, wherein the at least one location datum of the first terminal indicates whether the first terminal is proximate to the local area network or is not proximate to the local area network;
comparing the location datum of the first terminal with the location datum associated with the implementation of the requested service; and
as a function of results of the comparison, implementing the requested service on the object to perform the at least one action; and
if the requested service is not conditioned on said object with at least one location datum, controlling operation of the object by:
implementing the requested service on the object to perform the at least one action.

2. The method for conditional implementation of a service according to claim 1, further comprising, prior to the act of receiving a message comprising at least one location datum of the first terminal, acts of:
evaluating the location datum associated with the implementation of the service, and according to the results of the evaluation:
transmitting, over the local area network, the request for location of the first terminal, comprising at least said identifier of said first terminal.

3. The method for conditional implementation of a service according to claim 1, further comprising the following acts:
acquiring the location datum to be associated with the implementation of the service;
storing the location datum associated with the implementation of the service.

4. The method for conditional implementation of a service according to claim 1, wherein:
the location datum of the first terminal received indicates a distance from the first terminal to a second terminal of the local area network;
the location datum associated with the implementation of the service indicates a maximum distance from the first terminal to said second terminal of the local area network.

5. The method for conditional implementation of a service according to claim 1, wherein:
the location datum of the first terminal received indicates the presence of the first terminal within the range of the local area network;
the service is implemented on the object only if the first terminal is within the range of the local area network.

6. The method for conditional implementation of a service according to claim 1, wherein the at least one location datum is based on a presence message broadcasted by the first terminal over a communication channel that is distinct from the local area network.

7. The method for conditional implementation of a service according to claim 6, wherein the at least one location datum is based on whether the management device receives or does not receive the presence message broadcasted by the first terminal.

8. The method for conditional implementation of a service according to claim 6, wherein the at least one location datum is not based global positioning system (GPS) coordinates.

9. A connected object of a local area network, capable of communicating with a local area network through a gateway that includes a location management device, said connected object comprising:
a processor; and
a non-transitory computer-readable medium comprising instructions stored thereon, which when executed by the processor configure the connected object to perform acts comprising:
storing look-up data in a memory of the object, said look-up data indicating, for at least one service, whether the service is conditioned on said object with at least one location datum or not;
receiving from a first terminal a request to implement a service of the at least one service for which look-up data is stored in the memory, said request comprising at least an identifier of the service and an identifier of said first terminal, wherein the service corresponds to at least one action to be performed by the object in the local area network;
using the look-up data in the memory to determine whether the requested service is conditioned on said object with at least one location datum or not;
if the requested service is conditioned on said object with at least one location datum, controlling operation of the connected object by:
transmitting to the management device of the gateway a request for determining location of said first terminal, said request comprising said identifier of the first terminal;
receiving a response message from the management device comprising at least one location datum of said first terminal, wherein the at least one location datum of the first terminal indicates whether the first terminal is proximate to the local area network or is not proximate to the local area network;

comparing the location datum of said first terminal with the location datum associated with the implementation of the requested service; and as a function of results of the comparison, implementing the requested service on the object to perform the at least one action; and if the requested service is not conditioned on said object with at least one location datum, controlling operation of the object by:

implementing the requested service on the object to perform the at least one action.

10. A non-transitory computer-readable medium comprising code instructions stored thereon for implementing a method for conditional implementation of a service on an object connected to a local area network, when the instructions are executed by a processor, wherein the object is connected to the local area network through a gateway including a location management device, the method comprising the following acts performed by the object:

storing look-up data in a memory of the object, said look-up data indicating, for at least one service, whether the service is conditioned on said object with at least one location datum or not;

receiving from a first terminal a request to implement a service of the at least one service for which look-up data is stored in the memory, said request comprising at least an identifier of the service and an identifier of said first terminal, wherein the service corresponds to at least one action to be performed by the object in the local area network;

using the look-up data in the memory to determine whether the requested service is conditioned on said object with at least one location datum or not;

if the requested service is conditioned on said object with at least one location datum, controlling operation of the object by:

transmitting to the management device of the gateway a request for determining location of said first terminal, said request comprising said identifier of the terminal;

receiving a response message from the management device comprising at least one location datum of the first terminal, wherein the at least one location datum of the first terminal indicates whether the first terminal is proximate to the local area network or is not proximate to the local area network;

comparing the location datum of the first terminal with the location datum associated with the implementation of the requested service; and as a function of the results of the comparison, implementing the requested service on the object to perform the at least one action; and if the requested service is not conditioned on said object with at least one location datum, controlling operation of the object by:

implementing the requested service on the object to perform the at least one action.

11. A system for controlling conditional implementation of a service in a local area network, comprising:

a first terminal capable of communicating with the local area network through a gateway, said terminal comprising:

a first processor; and a first non-transitory computer-readable medium comprising instructions stored thereon, which when executed by the first processor configure the first terminal to perform acts comprising:

broadcasting a presence message over a communication channel that is distinct from the local area network;

sending a request to implement a service, said request comprising at least an identifier of the service and an identifier of said first terminal, wherein the service corresponds to at least one action to be performed by at least a connected object in the local area network; and wherein the request is sent on said communication channel that is distinct from the local area network;

the at least one connected object of the local area network, which is capable of communicating with the local area network through the gateway, each of said at least one connected object comprising:

a second processor; and a second non-transitory computer-readable medium comprising instructions stored thereon, which when executed by the second processor configure the connected object to perform acts comprising:

storing look-up data in a memory of the object, said look-up data indicating, for at least one service, whether the service is conditioned on said object with at least one location datum or not;

receiving from the first terminal the request to implement the service, said request comprising at least the identifier of the service and the identifier of said first terminal;

using the look-up data in the memory to determine whether the requested service is conditioned on said object with at least one location datum or not;

if the requested service is conditioned on said object with at least one location datum, controlling operation of the connected object by:

transmitting to the gateway a request for determining location of said first terminal, said request comprising said identifier of the first terminal;

receiving a response message from the gateway comprising the at least one location datum of said first terminal, wherein the at least one location datum of the first terminal indicates whether the first terminal is proximate to the local area network or is not proximate to the local area network;

comparing the location datum of said first terminal with the location datum associated with the implementation of the requested service; and as a function of results of the comparison, implementing the requested service on the object to perform the at least one action; and if the requested service is not conditioned on said object with at least one location datum, controlling operation of the object by:

implementing the requested service on the object to perform the at least one action; and the gateway, which comprises a location management device comprising:

a third processor; and a third non-transitory computer-readable medium comprising instructions stored thereon, which when executed by the third processor configure the management device to perform acts comprising:

receiving the presence message broadcasted by said first terminal over the communication channel that is distinct from the local area network;

determining the location datum of said first terminal based on the presence message;
in response to receiving the presence message, storing the location datum of said first terminal in association with the identifier of the first terminal;
receiving the request over the local area network from said connected object for location of said first terminal, said request comprising the identifier of the first terminal;
retrieving the location datum stored in association with the identifier of the first terminal, in response to the request; and
sending the response message over the local area network to the object, the response comprising the location datum of said first terminal.

* * * * *